(12) United States Patent
Nachenberg et al.

(10) Patent No.: US 7,774,361 B1
(45) Date of Patent: Aug. 10, 2010

(54) EFFECTIVE AGGREGATION AND PRESENTATION OF DATABASE INTRUSION INCIDENTS

(75) Inventors: Carey Nachenberg, Northridge, CA (US); Abu Wawda, Los Angeles, CA (US); Adam Bromwich, Santa Monica, CA (US); On Lee, Redmond, WA (US); Darren Sanders, Santa Clarita, CA (US)

(73) Assignee: Symantec Corporation, Cupertino, CA (US)

( * ) Notice: Subject to any disclaimer, the term of this patent is extended or adjusted under 35 U.S.C. 154(b) by 280 days.

(21) Appl. No.: 11/177,775

(22) Filed: Jul. 8, 2005

(51) Int. Cl.
*G06F 7/00* (2006.01)
(52) U.S. Cl. .................. 707/779; 707/952; 726/23
(58) Field of Classification Search ............. 714/25, 714/48, 57, 701, 819; 726/22, 23, 25; 717/127; 380/1, 59
See application file for complete search history.

(56) References Cited

U.S. PATENT DOCUMENTS

| | | | |
|---|---|---|---|
| 4,959,849 A | | 9/1990 | Bhusri |
| 5,355,474 A | | 10/1994 | Thuraisngham et al. |
| 5,584,024 A | | 12/1996 | Shwartz |
| 5,664,172 A | | 9/1997 | Antoshenkov |
| 5,742,806 A | | 4/1998 | Reiner et al. |
| 5,826,076 A | | 10/1998 | Bradley et al. |
| 6,088,803 A | | 7/2000 | Tso et al. |
| 6,128,740 A | | 10/2000 | Curry et al. |
| 6,311,278 B1 | * | 10/2001 | Raanan et al. ............. 726/14 |
| 6,314,409 B2 | | 11/2001 | Schneck et al. |
| 6,356,887 B1 | * | 3/2002 | Berenson et al. ............. 707/2 |
| 6,584,569 B2 | * | 6/2003 | Reshef et al. ............. 726/25 |
| 6,598,038 B1 | | 7/2003 | Guay et al. |
| 6,775,657 B1 | | 8/2004 | Baker |
| 6,775,827 B1 | | 8/2004 | Harkins |
| 6,839,850 B1 | | 1/2005 | Campbell et al. |
| 6,928,553 B2 | | 8/2005 | Xiong et al. |

(Continued)

FOREIGN PATENT DOCUMENTS

WO          WO 01/71499 A1          9/2001

OTHER PUBLICATIONS

William G.J. Halfond and Alessandro Orso, Combining Static Analysis and Runtime Monitoring to Counter SQL-Injection Attacts, Workshop on Dynamic Analysis (WODA 2005) May 17, 2005, St. Louis, MO, USA.*

(Continued)

*Primary Examiner*—Neveen Abel Jalil
*Assistant Examiner*—Vei-Chung Liang
(74) *Attorney, Agent, or Firm*—Fenwick & West LLP

(57) ABSTRACT

An incident managing module aggregates related database intrusion incidents and presents them in a manageable manner. A receiving module receives an anomalous query requesting data from a database and a type-identification module identifies anomaly type for the query received. A conversion module converts the anomalous query into a characteristic representation. In some embodiments, this is done by replacing literal field values in the query with representative values. In other embodiments, this is done by creating a tuple describing anomaly parameters for the anomalous query. In still other embodiments, the query is converted into a characteristic representation that distinguishes between injected and non-injected portions of the query. An aggregation module then aggregates into a group the anomalous queries with substantially similar characteristic representations according to anomaly type and a generation module generates a database intrusion incident report describing the group of anomalous queries.

29 Claims, 4 Drawing Sheets

U.S. PATENT DOCUMENTS

| | | | |
|---|---|---|---|
| 7,085,780 | B2 | 8/2006 | Sakamoto et al. |
| 7,085,928 | B1 | 8/2006 | Schmid et al. |
| 7,120,645 | B2* | 10/2006 | Manikutty et al. ......... 707/102 |
| 7,120,933 | B2 | 10/2006 | Mattsson |
| 7,185,232 | B1* | 2/2007 | Leavy et al. ................. 714/41 |
| 7,237,265 | B2* | 6/2007 | Reshef et al. ................ 726/25 |
| 7,444,331 | B1* | 10/2008 | Nachenberg et al. .......... 707/6 |
| 2002/0065896 | A1 | 5/2002 | Burakoff et al. |
| 2002/0083343 | A1 | 6/2002 | Crosbie et al. |
| 2002/0087882 | A1 | 7/2002 | Schneider et al. |
| 2002/0157020 | A1* | 10/2002 | Royer ......................... 713/201 |
| 2003/0037251 | A1 | 2/2003 | Frieder et al. |
| 2003/0051026 | A1 | 3/2003 | Carter et al. |
| 2003/0069880 | A1 | 4/2003 | Harrison et al. |
| 2003/0101355 | A1 | 5/2003 | Mattsson |
| 2003/0133554 | A1 | 7/2003 | Nykanen et al. |
| 2003/0145226 | A1 | 7/2003 | Bruton et al. |
| 2003/0154402 | A1 | 8/2003 | Pandit et al. |
| 2003/0167229 | A1 | 9/2003 | Ludwig et al. |
| 2003/0188189 | A1 | 10/2003 | Desai et al. |
| 2003/0204719 | A1 | 10/2003 | Ben-Itzhak |
| 2003/0221123 | A1 | 11/2003 | Beavers |
| 2004/0098617 | A1 | 5/2004 | Sekar |
| 2004/0098623 | A1 | 5/2004 | Scheidell |
| 2004/0193656 | A1 | 9/2004 | Pizzo et al. |
| 2004/0199535 | A1* | 10/2004 | Zuk ........................... 707/102 |
| 2004/0205360 | A1 | 10/2004 | Norton et al. |
| 2004/0220915 | A1 | 11/2004 | Kline et al. |
| 2004/0250127 | A1 | 12/2004 | Scoredos et al. |
| 2004/0250134 | A1 | 12/2004 | Kohler et al. |
| 2004/0260945 | A1 | 12/2004 | Raikar et al. |
| 2005/0086529 | A1 | 4/2005 | Buchsbaum |
| 2005/0097149 | A1 | 5/2005 | Vaitzblit et al. |
| 2005/0138006 | A1 | 6/2005 | Bennett et al. |
| 2005/0138425 | A1* | 6/2005 | Kim et al. .................... 713/201 |
| 2005/0138426 | A1* | 6/2005 | Styslinger ................... 713/201 |
| 2005/0154733 | A1* | 7/2005 | Meltzer et al. ................ 707/10 |
| 2005/0203886 | A1* | 9/2005 | Wong ............................ 707/3 |
| 2005/0203921 | A1* | 9/2005 | Newman et al. ............ 707/100 |
| 2005/0273859 | A1* | 12/2005 | Chess et al. ................... 726/25 |
| 2005/0289187 | A1* | 12/2005 | Wong et al. ................. 707/200 |
| 2006/0070128 | A1* | 3/2006 | Heimerdinger et al. ....... 726/23 |
| 2006/0117386 | A1 | 6/2006 | Gupta et al. |
| 2006/0212438 | A1* | 9/2006 | Ng ................................ 707/4 |
| 2006/0212941 | A1* | 9/2006 | Bronnikov et al. ............ 726/24 |
| 2006/0242136 | A1* | 10/2006 | Hammond et al. ............ 707/4 |
| 2007/0074188 | A1* | 3/2007 | Huang et al. ................. 717/141 |
| 2007/0094728 | A1* | 4/2007 | Julisch et al. ................. 726/23 |
| 2007/0169194 | A1* | 7/2007 | Church et al. ................ 726/23 |

OTHER PUBLICATIONS

Lee, S.Y., et al., "Learning Fingerprints for a Database Intrusion Detection System", ESORICS 2002, Nov. 2002, p. 264-279.*

Kruegel, C. et al., "Anomaly Detection of Web-Based Attacks," CCS'03, Oct. 27-31, 2003, ACM, pp. 251-261.

AirCERT web page, last updated Sep. 18, 2000 [online]. Cert.org [retrieved Apr. 18, 2003]. Retrieved from the Internet<URL:http://www.cert.org/kb/aircert/>.

Analysis Console for Intrusion Detection (ACID) web page [online]. Andrew.cmu.edu [retrieved Apr. 18, 2003]. Retrieved from the Internet<URL:http://www.andrew.cmu.edu/~rdanyliw/snort/snortacid.html>.

"Caltarian Security Technology Platform," Riptech web pages [online]. Symanec.com [retrieved Apr. 18, 2003]. Retrieved from the Internet<URL:http://wnterprisesecurity.symantec.com/Content/displayPDF.cfm?SSSPDFID=35&EID=O>.

Change log for Analysis Console for intrusion Detection (Acid), indicating release date of Sep. 8, 2000 [online]. Andrew.cmu.edu [retrieved Apr. 18, 2003]. Retrieved from the Internet:<URL:http://www.andrew.cmu.edu/~rdanyliw/snort/CHANGELOG>.

CyberGuard Corporation, "CyberGuard and Webwasher: The Value Proposition," A CyberGuard Corporation White Paper, May 2004, 6 pages.

e=Security, Inc., Correlation Technology for Security Event Management, Oct. 7, 2002 [online]. eSecurityins.com [retrieved Apr. 18, 2003]. Retrieved from the Internet<URL:http://www.esecurityinc.com/downloads/Correlation_WP.pdf>.

Marketing, "Digital Certificates—Best Practices—A Microdasys Whitepaper," bestpractice.doc, Revision 1.1 (Jul. 31, 2003), 6 pages, Czech Republic.

Microdasys, "S C I P Secured Content Inspection: Protecting the Enterprise from CryptoHacks," 2003 by Microdasys Inc., 2 pages, Czech Republic.

MyNetWatchman.com web pages indicating 9/00 beta release [online]. MyNetWatchman.com [retrieved Apr. 18, 2003]. Retrieved from the Internet<URL:http://www.mynetwatchman.com/mynetwatchman>.

Network Computing Solutions—"Microdasys SCIP" [online]. Retrieved on Mar. 18, 2005. Retrieved from the Internet<URL:http://www.ncs/cz/index.php?language=en&menuitem-4&subitem=13>, 2 pages Czech Republic.

Network Computing Solutions—NSC Homepage—News [online]. Retrieved on Mar. 18, 2005. Retrieved from the Internet<URL:http:/nsc.cz/index/php?language=en&menuitem=0&subitem=4&subitem=13>, 3 pages, Czech Republic.

Parkhouse, Jayne, "Pelican Save TNet 2.0," [online]Jun. 2000, SC Magazine Product Review, [retrieved Dec. 1, 2003] Retrieved from the Internet<URL:http://www.scmagazine.com/standalone/pelican/s c_pelican.html>.

"PostgreSQL Interactive Documentation," May 2001, [online] [Archived by http://archive.org on Jun. 6, 2001; Retrieved on Dec. 19, 2006] Retrieved from the Internet<URL:http://web.archive.org/web/20010606011227/www.postgresql.org/idocs/index.php?overv...>.

2000 Review of eSecurity product on Network Security web page [online]. SCMagazine.com [retrieved Apr. 18, 2003]. Retrieved from the Internet<URL:http://www.scmagazine.com/scmagazine/2000_12/testc/network.htm#Open>.

Schneier, Bruce, Managed Security Monitoring: Network Security for the $21^{st}$ Century, 2001 [online]. Conterpane.com [retrieved Apr. 18, 2003]. Retrieved from the Internet<URL:http://www.counterpane.com/msm.pdf>.

SCIP Product, Microdasys—"The need to control, inspect and manage encrypted webtraffic." [online]. Retrieved on Mar. 18, 2005. Retrieved from the Internet<URL:http://www.microdasys.com/scipproduct+M54a708de802.html>. Author unknown, 2 pages, Czech Republic.

Slashdot.org web pages describing Dshield, dated Nov. 27, 2000 [online]. Slashdot.org [retrieved Apr. 18, 2003]. Retrieved from the Internet<URL:http://slashdot.org/article.pl?sid=00/11/27/1957238& mode=thread>.

SSL Stripper Home Page, "Security Solutions: Sample Screenshots," [online]. Retrieved on Mar. 18, 2005. Retrieved from the ineternet<URL:http://www.vroyer.org/sslstripper/index.html>, 2 pages, Oct. 15, 2004, U.S.A.

"SSL Stripper Installation Guide," [online]. Retrieved in Mar. 2005 from the Internet<URL:http://www.sslstripper.com>, 2 pages, U.S.A.

SSL Stripper Sample Screenshots. "Security Solutions: Sample Screenshots," [online]. Retrieved on Mar. 18, 20056. Retrieved from the Internet<URL:http://www.vroyer.org/sslstripper/screenshots.html>, 3 pages, Oct. 15, 2004, U.S.A.

Web page, announcing Nov. 11, 2000 release of Dshield [online]. Deja.com [retrieved Apr. 18, 2003]. Retrieved from the Internet<URL:http://groups.google.com/groups?selm=8vm48v%245pd%241%40nnrp1,deja.com&oe=UTF-8&output=gplain>.

Webwasher AG/Full feature set, "Full feature set," [online]. Retrieved on Mar. 18, 2005. Retrieved from the Internet<URL:http://www.webwasher.com/enterprise/products/webwasher_products/s sl_scanner/full_feature_set..html?l...>, 2 pages.

Webwasher AG/Webwasher Anti Spam, "Webwasher Anti Spam," [online]. Retrieved on Mar. 18, 2005. Retrieved from the Internet<URL:http://www.webwasher.com/enterprise/products/webwasher_products/anti_spam/index.htm...>, 1 page.

Webwasher AG/Webwasher Anti Virus, "Webwasher Anti Virus," [online]. Retrieved on Mar. 18, 2005. Retrieved from the Internet<URL:http://www.webwasher.com/enterprise/products/webwasher_products/anti_virus/index.html..>, 2 pages.

Webwasher AG/Webwasher Content Protection,"Webwasher Content Protection," [online]. Retrieved on Mar. 18, 2005. Retrieved from the Internet<URL:http://www.webwasher.com/enterprise/products/webwasher_products/content_protection/index.html>, 2 pages.

Webwasher AG/Webwasher 1000 CSM Appliance, "Webwasher 1000 CSM Appliance," [online]. Retrieved on Mar. 18, 2005. Retrieved from the Internet<URL:http://www.webwasher.com/enterprise/products/webwasher_products/scm_appliance/index...> 2 pages.

Webwasher AG/Webwasher SSL Scanner, "Webwasher SSL Scanner," [online]. Retrieved on Mar. 118, 2005. Retrieved from the Internet<URL:http://www.webwasher.com/enterprise/products/webwasher_products/ssl_scanner/index.html 2 pages.

Webwasher AG/Webwasher URL Filter, "Webwasher URL Filter," [online]. Retrieved on Mar. 18, 2005. Retrieved from the Internet<URL:http//www.webwasher.com/enterprise/products/webwasher_products/webwasher_url_filter..>, 1 page.

1 page.

Symantec™ Incident Manager http://enterprisesecurity.symantec.com, copyright date Jun. 2003.

Chung, C.Y. et al., "DEMIDS: A Misuse Detection System for Database Systems," Department of Computer Science, University of California At Davis, Oct. 1, 1999, pp. 1-18.

Johnson R., Protecting Your Data and Your Microsoft SQL Server, Entercept Security Technologies, p. 1-12 [online], Oct. 2, 2002, [retrieved on Jan. 30, 2004]. Retrieved from the Internet::<URL: http://networkassociates.com/us/tier2/products/media/mcatee/wo-sq/protection.pdf>.

Kr ügel. C. et al., "A Survey on Intrusion Detection Systems," Distributed Systems Group. Technical University of Vienna, Dec. 12, 2000, pp. 1-36.

Lee, S.Y. et al., "Learning Fingerprints For A Database Intrusion Detection System," ESORICS 2002, LNCS 2502, pp. 264-279, Nov. 2002, Springer-Verlag, Germany.

Low, W.L et al., "DIDAFIT: Detecting Intrusions in Databases Through Fingerprinting Transactions," ICEIS 2002—Databases and Information Systems Integration, 2002, pp. 121-128.

Ramasubramanian, P. et al., "Quickprop Neural Network Ensemble Forecasting Framework For A Database Intrusion Prediction System," Neural Information Processing—Letters and Reviews, Oct. 2004, pp. 9-18, vol. 5, No. 1.

Solutions by Tech Target, Entercept Database Edition, Nov. 2002, [retrieved on Jan. 9, 2004]. Retrieved from the Internet: <URL: http//infosecuritymag.techtarget.com/2002/nov/solutions.shtml>.

Valeur, F. et al, "A Learning-Based Approach to the Detection of SQL Attacks," Proceedings of the Conference on Detection of Intrusions and Malware & Vulnerability Assessment (DIMVA) , Vienna, Austria, Jul. 2005, 18 pages.

Archive of "Postgre SQL 7.1 Documentation," www.postgresql.org, [online] [Archived by http://archive.org on Jun. 6, 2001; Retrieved May 2001] Retrieved from the Internet<URL:http//web.archive.org.web/20010606011227/www.postgresql.org/idocs/index.php?overv...>.

Oracle, "Understanding Query Expressions," Oracle 8 ConText Cartridge Application Developer's Guide, Release 2.3, 1997, [online] [Retrieved on Mar. 9, 2007] Retrieved from the Internet<URL:http://download-east.oracle.com/docs/cd/A58617_01/cartridg.804/a58164/ch03.htm>.

Pfleeger, Charles P., "Security in Computing," $2^{nd}$ edition, 1996, pp. 426-433.

Weisstein, E.W., "The CRC Concise Encyclopedia of Mathematics," 1998, p. 1726.

* cited by examiner

EFFECTIVE AGGREGATION AND PRESENTATION OF DATABASE INTRUSION INCIDENTS

BACKGROUND OF THE INVENTION

1. Field of the Invention

This invention pertains in general to computer security and incident management in database intrusion detection and prevention systems, and more specifically to organizing and aggregating database-specific incidents to improve a user's experience and make a computer system more manageable.

2. Description of the Related Art

Databases are widely used by companies to store both public and private information. Commonly, companies provide interfaces to their databases that are publicly accessible. For example, a website associated with a store might include a field that allows a user to type in a search term, allowing a user to retrieve a list of items of a particular type that are sold by the store (i.e., in a search field for product type, the user might type in "books" to retrieve a list of books sold by the store). This search field is a publicly-accessible interface to a database that resides behind store's application server, and the database stores data describing the items for sale.

Many of these publicly-accessible databases work by having a web server provide a web browser executing on a client computer with an HTML and/or JavaScript-based form. The web browser displays this form on the client, and the end-user provides values for the fields in the form (i.e., the user inserts a search term into a "search field"). The end-user performs an action, such as pressing a "Submit" button that causes the web browser to send the entered values to the server. At this point, back-end logic at the server translates this information into one or more queries that issue to the database using the user-supplied values. This query executes on the database and the server returns the results to the client web browser (i.e., user receives the search results).

Databases can suffer malicious attacks in which a malicious query is sent to the database to cause damage in some manner, such as to obtain access to confidential information stored in the database. In an SQL (Structured Query Language) injection attack, the attacker fills out the form using specially-crafted data. These data, when used by the server to generate a query to the database, result in a malicious query being sent to the database on behalf of the attacker. The malicious query executes on the database and results in a malicious action. By using these techniques, the attacker can inject code to obtain access to credit card numbers and other confidential information, modify or delete information on the database, or perform other malicious actions. As used herein, a malicious query can also include any query with potentially anomalous or undesired effects (e.g., a user error in which the user has deleted important data from a database by accident, rather than deleting such data with bad intent).

Database intrusion detection systems ("DIDS") can help thwart these types of malicious attacks. An anomaly-based DIDS commonly resides between the front-end application and the back-end database. The DIDS can be trained to learn and recognize over the course of several days or weeks, the set of acceptable queries issued to a database by clients (e.g., applications like PEOPLESOFT® or SAP® (Systems Applications and Products in Data Processing).

Typically, queries sent to a database are going to appear in the same format over and over again, since the web browser displays the same set of forms with fixed search fields to the end-users. Only the search term entered by the end-user will differ. Thus, databases, unlike many applications, are uniquely suited for anomaly-based intrusion detection, because the set of queries sent by the application to the database is often so consistent over time that it is rare for a query to appear that has not been seen before. The DIDS, once trained to recognize legitimate queries, monitors all incoming queries and reports when a query is sent that fails to match one of the learned queries.

Ideally, this DIDS approach should result in few false positives (i.e., reports of anomalous queries that turn out to be legitimate). However, companies do update applications on a regular basis, in many cases changing the logic of the application significantly. These modifications sometimes result in changes to the queries that are issued by the application to the database. If the change occurs after the training period, the anomaly-based DIDS system may report a false positive. If the query is used repeatedly (i.e., if it is a high-volume query that many users are making regularly), this could result in thousands of false positives within minutes of the change to the application.

As an example, consider the following query to a website selling books (e.g., amazon.com):

select * from book_table where title='sometitle'

Now consider what would happen if the bookseller changed its query, as it evolved from being a bookseller to a seller of many different types of products (including books):

select    *    from    product_table    where product_name='sometitle'

Assuming the database schema was properly changed to support this query and the database repopulated with the proper data, this query would provide the same functionality for the user as the original query, yet it looks entirely different. Consequently, this updated query could be detected as anomalous by a DIDS system. If this query were issued each time a user searched for a book on the bookseller's website, it might be used hundreds or thousands of times per second by users around the world. This would result in a flood of hundreds or thousands of (false positive) incidents being generated per second. Without proper aggregation of these incidents, such a flood would overwhelm the database administrator and make it nearly impossible to manage the DIDS system.

In addition, even in a situation where the detected anomalous queries represent true attack scenarios rather than false positives, it is useful to aggregate the same type of attack into a single incident for management purposes. Rather than receiving a report of each and every attack, a database administrator will receive a single report for a group of similar attacks.

Thus, there is a need in the art for a means to reduce the impact of false positives of all types by aggregating related database intrusion incidents in an intuitive and manageable fashion to reduce and/or eliminate such flood conditions and to make the DIDS system more manageable during updates of enterprise applications and database schema.

BRIEF SUMMARY OF THE INVENTION

The above need is met by an incident managing module that aggregates related database intrusion incidents and presents these incidents in a more manageable manner. A receiving module receives an anomalous query requesting data from a database and a type-identification module identifies an anomaly type for the query received. A conversion module converts the anomalous query into a characteristic representation. In some embodiments, this is done by replacing literal field values in the query with representative values. In other embodiments, this is done by creating a tuple describing anomaly parameters for the anomalous query. In still other embodiments, the query is converted into a characteristic representation that distinguishes between injected and non-injected portions of the query. An aggregation module then aggregates into a group the anomalous queries with substantially similar characteristic representations according to anomaly type and a generation module generates a database intrusion incident report (e.g., a single database intrusion report) describing the group of anomalous queries.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The incident managing module disclosed herein provides a means to reduce the impact of false positives or of malicious attacks of different types by aggregating related database intrusion detection incidents in an intuitive fashion to reduce the number of incidents reported. Thus, the DIDS output will be more manageable when application developers update enterprise applications and database schema. Without this incident managing module, updates to a monitored database/application can cause a DIDS system to report thousands of false positive alerts. With this incident managing module, only a single or handful of incidents will be generated, substantially reducing the load on the database administrator. The incident managing module disclosed herein groups anomalous query detection events into incidents in an intuitive and manageable fashion, thus permitting "single-click" exclusions of many types of false positives or of similar malicious queries, making the DIDS easier to use for database administrators.

Figure 1:
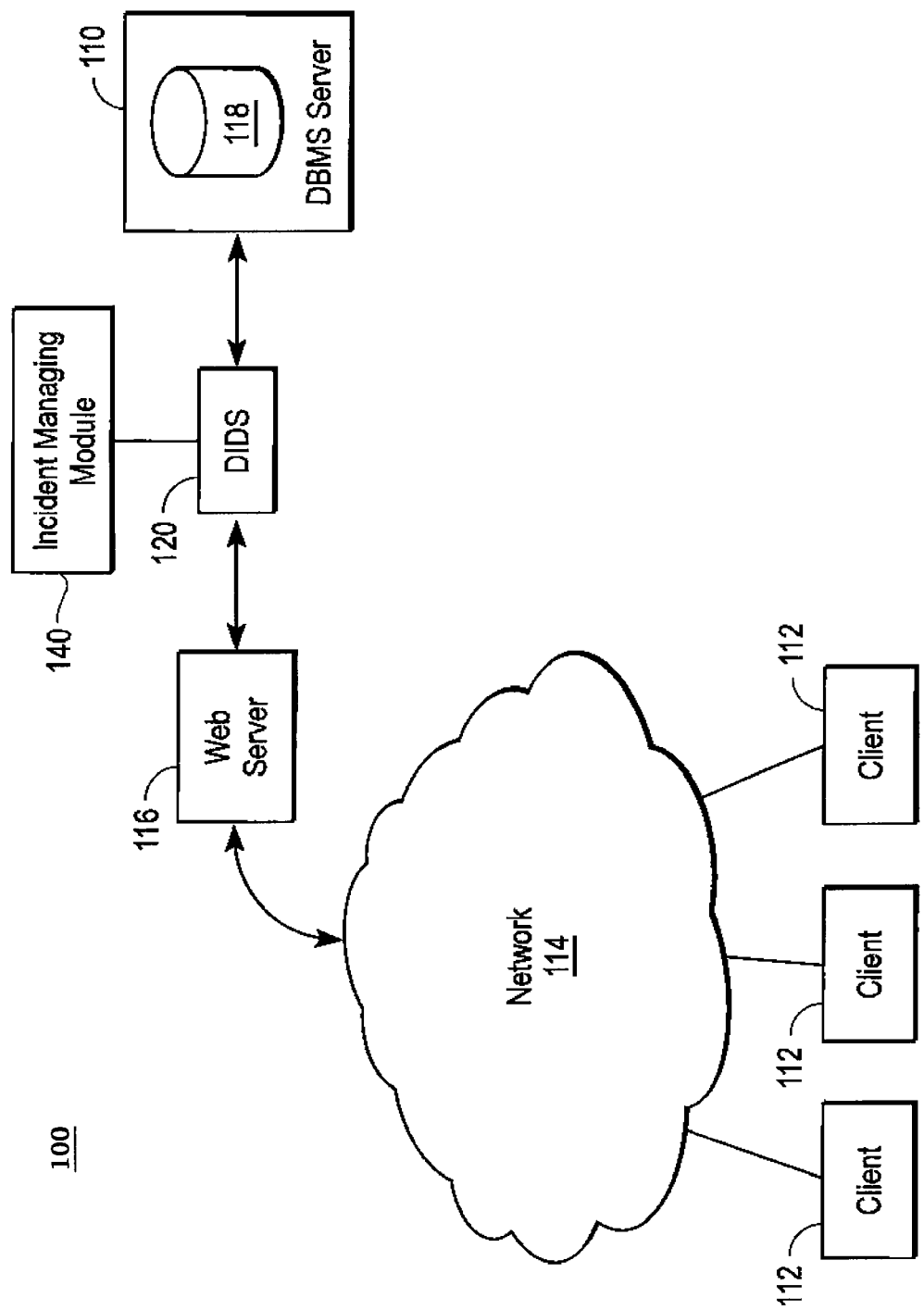
FIG. 1 is a block diagram illustrating a high-level view of a typical environment where it is desirable to reduce false positive or malicious attack detections by aggregating related incidents and presenting them in a manageable manner.

FIG. 1 is a high-level diagram illustrating a typical environment 100 in which database intrusion could occur and it is desirable to detect anomalous queries while minimizing the number of false positive detection events or malicious query detection events by aggregating related detection incidents. The environment includes a database management server (DBMS) 110 in communication with multiple client computers 112 via a network 114. Only three client computers 112 are shown in FIG. 1 for purposes of clarity, but those of skill in the art will recognize that typical environments can have hundreds or thousands of client computers 112, and can also have multiple DMBSs 110. Although not shown in FIG. 1, there can be many other computers connected to the network 114. One of ordinary skill in the relevant art will appreciate that the incident managing module is also applicable within a broad range of database configurations, including online transaction processing (OLTP), decision support systems (DSS), object databases, data marts, data warehouses, federated database systems, embedded databases, relational databases, object relational databases, flat file databases, hierarchical databases, custom data management code, and the like.

An "anomalous query" is a database query that differs in some manner from the queries that the DIDS 120 typically observes or that the DIDS 120 observed during training. For example, an anomalous query can be a query with anomalous query text that the DIDS 120 has never observed before (i.e., does not match any queries observed during the training of the DIDS 120). The anomalous query can also include known query text, but anomalous parameters. In this instance, the query has been observed before (i.e., during training of the DIDS 120) and the query text is recognized, but the query is being issued by an anomalous user, from an anomalous IP address, from an anomalous source machine, has an anomalous field value (i.e., uses a wildcard in a field where there should not be one), etc. The anomalous query can further be a known query in which SQL injection has been used to inject code into the query. In this case, a portion of the query text is known (i.e., the non-injected portion that has been observed before by the DIDS 120, for example, during training), and a portion of the query text is unknown (e.g., the injected portion of the query).

A query might be anomalous because of a number of reasons. For example, a query might appear anomalous because the database 118 changed since the training period and the query templates no longer accurately describe the legitimate queries. A query might appear anomalous because the application has been updated so that the application logs into the database 118 using a new account, or if a new application server is set up with a new IP address so that the server issues the same queries as other servers but from an unrecognized IP address. A query might appear anomalous due to a mistraining of the DIDS 120 or because the query contains a malicious code injection or an unexpected wildcard character within one of its fields. Most of these examples represent queries that appear anomalous to the DIDS 120, but do not actually represent database intrusion events.

The network 114 enables data communication between and among the entities connected to the network and in one embodiment is the Internet. In another embodiment, the network 114 is a local area network (LAN) or wide area network (WAN) operated by an enterprise and is not necessarily coupled to the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 114 can be represented using technologies and/or formats including the hypertext markup language (HTML), the extensible markup language (XML), the simple object access protocol (SOAP), common object request broker architecture (CORBA), etc. In addition, all or some of the links can be encrypted using conventional encryption technologies such as the secure sockets layer (SSL), secure HTTP and/or virtual private networks (VPNs). In another embodiment, the entities can use custom and/or dedicated data communications technologies instead of, or in addition to, the ones described above. In some embodiments, there is no network 114 connecting the DBMS 110 and the computer from which queries are sent, but instead the DBMS 110 and query-input program both run on the same computer.

The DBMS 110 manages a database 118 that stores a collection of information. The information can include, for example, names, addresses, credit card numbers, social security numbers, products offered for sale, medical histories, etc. In one embodiment, the database 118 is a relational database and in another embodiment the database is a flat-file database. Although the database 118 is shown within the DBMS 110, it can in fact be external and/or remote from the DBMS. Depending upon the embodiment, the DBMS 110 and/or database 118 can be centralized at one location or distributed over multiple locations. The DBMS 110 exchanges data with the client computers 112 via the network 114. The DBMS 110 receives queries from the client computers 112 and provides data from the database 118 to the client computers in response.

In one embodiment, a web server 116 acts as an intermediary between the DBMS 110 and the client computers 112. The DBMS 110 functionality can also be integrated into the web server 116 or vice-versa. Those of ordinary skill in the art will understand that the web server 116 is absent in some embodiments.

In one embodiment, the web server 116 exchanges data with the client computers 112 using HTTP and/or other protocols. The exchanged data provides a means by which the client computers 112 can access the database 118. The web server 116 receives data from the client computers 112, uses the data to generate queries, and passes the queries to the DBMS 110. The DBMS 110 executes the queries on the database 118 and passes the results of the queries back to the web server 116. The web server 116 then passes the results of the queries back to the client computers 112.

For example, the web server 116 can use HTTP to provide the client computers 112 with HTML-encoded web pages having forms for entering data. The web server 116 receives query strings from the client computers 112 incorporating data entered into the forms. The web server 110 extracts the data from the query strings and uses the data to create queries, which it then passes to the DBMS 110 for execution. In one embodiment, the queries are formulated in the Structured Query Language (SQL), but other embodiments can use other languages or techniques for representing the queries. The web server 116 provides the results of the query to the client computers 112 via new HTML-encoded web pages.

In another example, the web server 116 uses web services to interact with the client computers 112. The web server 116 utilizes an XML schema that is provided to, or otherwise known by, the client computers 112. The web server 116 receives messages encoded using the XML schema from the client computers 112 via SOAP over HTTP. The web server 116 parses the XML-encoded messages to extract data, and uses the data to create the queries executed by the DBMS 110.

In one embodiment, a database intrusion detection system ("DIDS") 120 is connected to the network 114. Although FIG. 1 shows the DIDS 120 connected to the network at a location between the web server 116 and the DBMS, any location where the DIDS 120 can monitor queries sent by the client computers 112 and data supplied by the DBMS 110 in response to the queries will suffice. In one embodiment, all or some of the functionality of the DIDS 120 is integrated into the DBMS 110 and/or web server 116.

The DIDS 120 monitors data exchanged between the DBMS 110 and client computers 112 and detects malicious queries such as those containing code injection attacks. The DIDS 120 blocks the malicious queries from executing and thereby protects the database 118. In one embodiment, the DIDS 120 automatically adapts to changes in the database 118 structure by training itself to recognize new legitimate queries. This ongoing training allows the DIDS 120 to be used effectively in environments having changing databases.

In the embodiment illustrated in FIG. 1, an incident managing module 140 for aggregating and presenting database intrusion incidents is a component of the DIDS 120. The incident managing module 140 can be a discrete application program, or the module 140 can be integrated into another application program. In some embodiments, all or a portion of the incident managing module 140 is executed on the web server 116 or DBMS 110, in or tightly coupled to the database 118, on a separate server or device connected to the database 118, as batch application, and the like. In some embodiments, the module 140 can run in multiple copies, for example on separate computers, more than one copy on the same computer, or associated with multiple database instances (e.g., as in a clustered database system).

The client computers 112 are utilized by end-users to interact with the DBMS 110. In one embodiment, a client computer 112 is a typical personal computer such as an IBM-PC (International Business Machines Corporation) or APPLE MACHINTOSH® Operating System compatible computer. In another embodiment, a client computer 112 is another type of electronic device, such as a cellular telephone, personal digital assistant (PDA), portable email device, etc. In one embodiment, a client computer 112 executes a web browser that receives an HTML-encoded web page from the web server 116 and displays it to the end-user. The web page contains a form for accepting information. The end-user uses a keyboard or other user input device to provide information into the form, and the web browser encodes the information in a query string and sends it to the web server 116. In another embodiment, a client computer 112 executes a program for interfacing with the web server 116 using web services.

As is known in the art, the client computers 112 preferably execute an operating system and one or more application programs. As used herein, the term "application" or "software application" can include any type of software or program, a component of a program, a service, an object, a distributed object, or a collection of one or more of these. The operating system controls the operation of the computer system, and some examples of such an operating system include LINUX® Operating System or one of the versions of MICROSOFT WINDOWS® Operating System.

Figure 2:
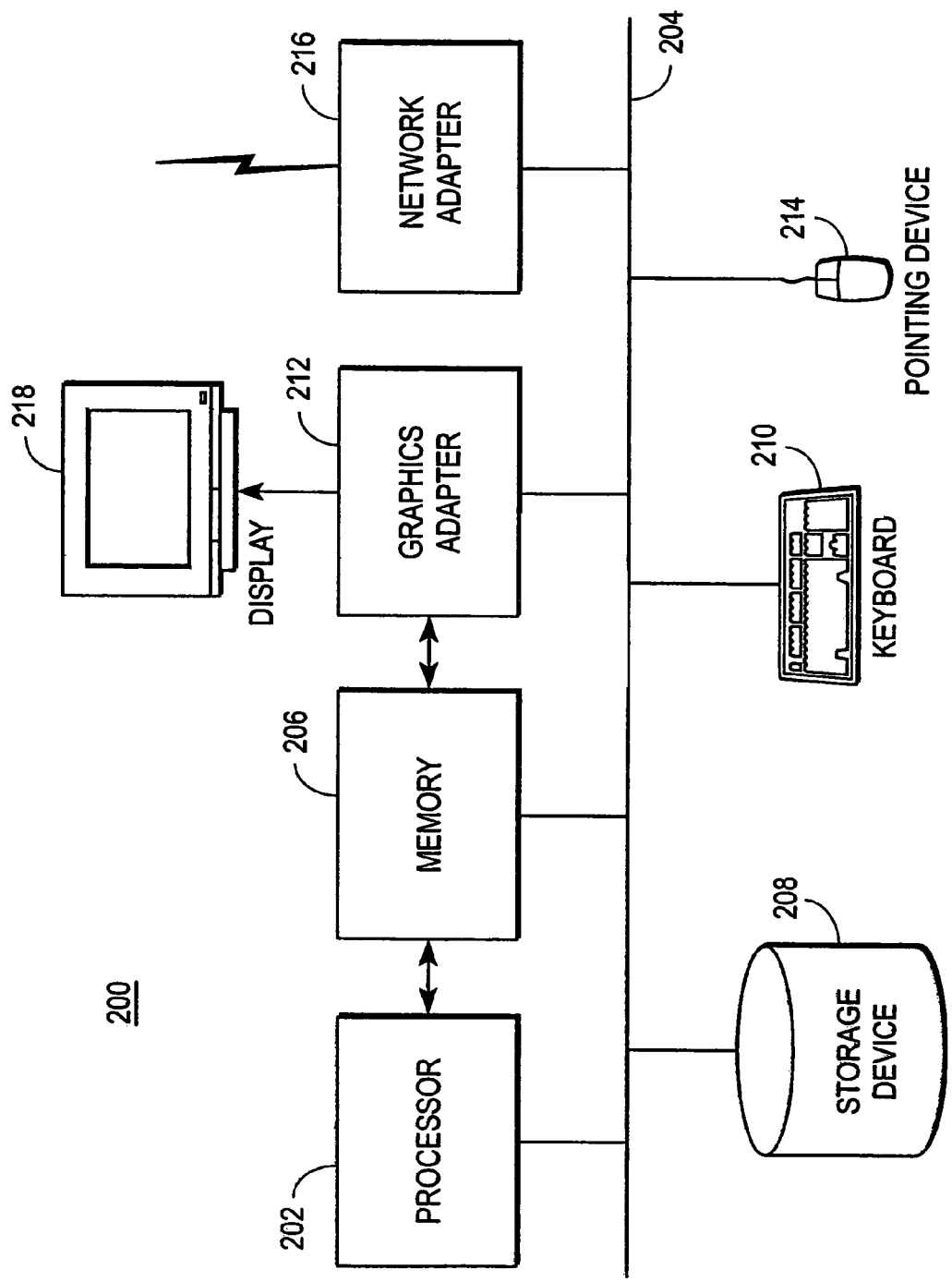
FIG. 2 is a high-level block diagram showing a computer system for acting as a database management system (DBMS) server, web server, database intrusion detection system ("DIDS") and/or a client computer according to one embodiment of the present invention.

FIG. 2 is a high-level block diagram showing a computer system 200 for acting as a DBMS server 110, web server 116, DIDS 120 and/or a client computer 112 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. Computer systems acting in different roles may have different and/or additional elements than the ones shown in FIG. 2. For example, a computer system 200 acting as a DBMS 110, DIDS 120 or web server 116 may have greater processing power and a larger storage device than a computer system acting as a client computer 112. Likewise, a computer system acting as a DBMS 110, DIDS 120, or web server 116 may lack devices such as a display 218 and/or keyboard 210 that are not necessarily required to operate it.

The processor 202 may be any general-purpose processor such as an INTEL x86®, SUN MICROSYSTEMS SPARC®, or POWERPC® compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules form a computer program product and are stored on a computer-readable storage medium such as the storage device 208, loaded into the memory 206, and executed by the processor 202. Alternatively, hardware or software modules may be stored elsewhere within the computer system 200.

Figure 3:
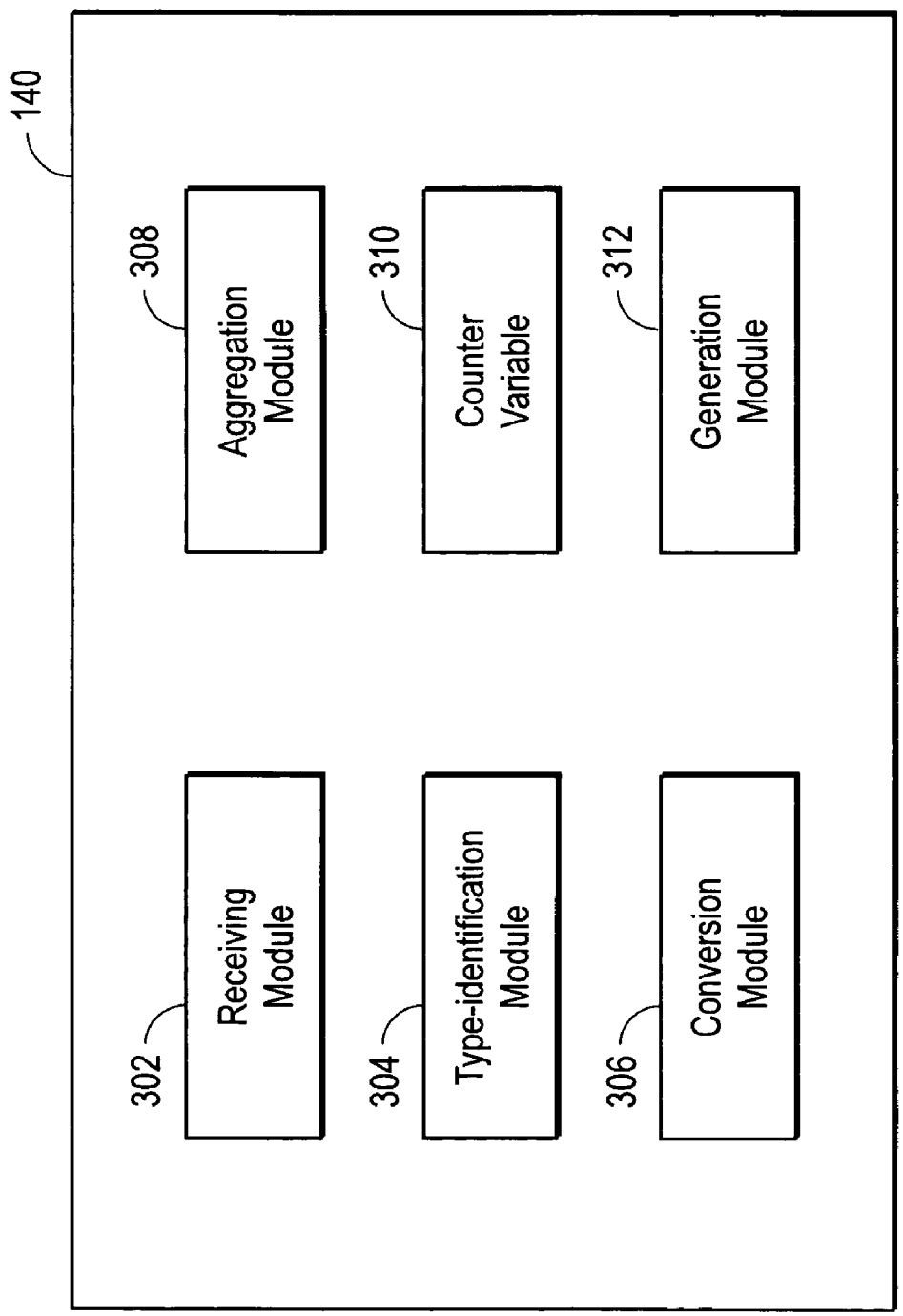
FIG. 3 is a high-level block diagram illustrating an incident managing module according to one embodiment of the present invention.

FIG. 3 is a high-level block diagram illustrating a more detailed view of the incident managing module 140 according to one embodiment. The incident managing module 140, in the embodiment illustrated in FIG. 3, includes a receiving module 302, a type-identification module 304, a conversion module 306, an aggregation module 308, a counter variable 310, and a generation module 312. Those of skill in the art will recognize that other embodiments can have different and/or additional modules than those shown in FIG. 3 and the other figures. Likewise, the functionalities can be distributed among the modules in a manner different than described herein.

The receiving module 302 receives an anomalous database query requesting data from a database 118. These data can include incoming queries from the web server 116, client computers 112, and/or other entities on the network 114. In one example, a web browser executing on a client computer 112 displays a HTML and/or JavaScript-based form on the client 122, and an end-user provides values for the fields in the form. The user might insert a search term into a "search field" in the form, and thus the user causes a query to be sent to the database 118 requesting the information regarding the search term. The web browser sends the entered values to the server, and the server translates this information into one or more queries that issue to the database using the user-supplied values.

The type-identification module 304 identifies the anomaly type for the query received. The type-identification module can separate out query events into different categories of anomalous queries. A number of different anomaly types can be identified by the type-identification module 304. As one example, the query received can have anomalous query text that has not been previously received by the receiving module and which has generally never seen before by the DIDS 120. In other words, the actual text of the query "select * from credit_card_table . . . " does not match any queries observed during the training session for the DIDS 120. Such an event might occur if an application developer adds a new query to the front end application, but does not fully re-train the DIDS 120 system. In that instance, the DIDS 120 may detect this type of query to be an anomalous query, and thus relay a false positive to the security administrator.

Another type of query that can be identified by the type-identification module 304 is a query with anomalous parameters, but with known query text that has been previously received. This category includes queries which have been observed during training of the DIDS 120 (i.e. the entire query's text "select * from . . . " is recognized and was observed during training), but that are being issued by an anomalous user, from an anomalous IP, from an anomalous source machine, have an anomalous field value (i.e. it uses a wildcard in a field where it should not), have anomalous time, value, or frequency (i.e., 10,000 known queries from a known user, but in 0.1 seconds or a known user attempting to access a database at an anomalous time, such as at 2 a.m., where the user normally accesses from 9 a.m. to 5 p.m.), etc. In other words, the DIDS 120 expects the query that is being issued, but has never seen user "John" issuing it before, so it is identified to be anomalous. Such an event might occur if an application developer updates the application so it logs into the database 118 using a new database account, e.g. switching from login "appuser" to login "appuser2." In this case, the expected queries will be issued, but instead of being issued by "appuser" as they were during the training period for the DIDS 120, they are issued by "appuser2" now, and appear anomalous. The DIDS 120 will thus relay a false positive to the security administrator.

Yet another example of an anomalous query includes a query with anomalous code injected into known query text that has been previously received. The DIDS 120 has seen a portion of the text before (i.e., during training), but there is a portion added to the known query that the DIDS 120 has not generally seen before. This is an example in which SQL injection has likely occurred. In a SQL injection attack, the attacker fills out the form using specially-crafted data. These data, when used by the server to generate a query to the database, result in a malicious query being sent to the database on behalf of the attacker. The malicious query executes on the database and results in a malicious action. For example, in a login form, a legitimate end-user would enter his name "Fred" and password "legitimate" in the appropriate fields. When these values are returned to the server, the server places the values into two variables, for example "name$" and "pass$." The back-end logic constructs a query using the values of these variables, such as the following:

Query$="select * from users where name='"+name$+"' and pass='"+pass$+"'".

The back-end logic replaces the variables with the user-supplied values and produces the query:

Query$="select * from users where name='Fred' and pass='legitimate'".

This query, when executed on the database, validates that the end-user supplied a matching name/password pair by returning the user's information if the data are correct.

In a SQL injection attack, the user might supply the specially-crafted string:

' or age >=0--' as the name and "any" as the password. The back-end logic will construct the query to the database as:

Query$="select * from users where name=' ' or age >=0--' and pass='any'"

The "--" sequence denotes a comment in SQL, so the resulting query is interpreted as follows:

select * from users where name=' ' or age >=0

This query will select all users from the USERS table where the user's name is equal to the empty string ' ' OR where the user's AGE (another field in the database in this example) is greater than or equal to zero years old. Since every user is at least zero years old, this augmented query will select all users and return their results to the attacker. By using these techniques, the attacker injects code to obtain access to credit card numbers and other confidential information, modify or delete information on the database, or perform other malicious actions. The attacker can also attempt to shut down a website by requesting an enormous amount of information from the database.

The conversion module 306 converts the anomalous query received by the receiving module 302 into a characteristic representation. In some embodiments, the characteristic representation may vary depending upon type of anomalous query. In one example, the anomalous query is converted into a characteristic representation by replacing literal field values in the query with representative values in a canonical form. This might be used when an anomalous query with anomalous query text (i.e., the actual text of the query does not match queries observed during training) is received. In this example, the conversion module 306 canonicalizes the query text of the anomalous query by replacing some or all of the literal field values in the query with placeholders, removing extra whitespaces, etc.

As an example of this canonicalization, the following query:

"select * from users where name='Fred' and ID=10"

would become:

"select * from users where name=<string> and ID=<number>"

The text in the user's name field and the IDS field is replaced by generic text referring to a "string" and a "number." All queries regarding user name and ID of the structure shown above can be converted into this generic text query, and thus all name and ID queries will look exactly the same (or at least similar). The DID 120 will not create a new anomalous query detection incident for each name/ID query coming in from an end user since all of the queries will look the same. Thus, only one detection incident need be created. Any number of canonicalization schemes can be used as an alternative to or in conjunction with the one described above.

Since each anomaly detection event may have a slightly different set of parameters (i.e., which user issued the anomalous query, from which IP address the query was issued, the targeted database for the query, etc.), this parameter information can be collected into a tuple (e.g., {user,sourceIP,targetdatabase}) and then added as an attribute to the anomalous query detection incident. Each tuple can also have a count that indicates how many times each particular tuple of parameters was seen. In some embodiments, if the number of tuples is large, then only a maximum threshold number (e.g. N=10) of tuples need be stored with the incident before subsequent tuples are discarded or saved to a temporary file or log file separate from the report.

In the situation where a query is received with known query text, but anomalous parameters, the incident managing module 140 identifies the exact set of violations for the known query. For example, a different user than expected may have issued a query, but the query text itself is known to the system. This likely occurs when the application programmer updates the application to login to the database 118 via a different DB account. In another example, the query may have been issued from the different IP address than the query is usually issued from, but the query text itself is recognized. This might occur if the application administrator sets up a new application server with a new IP address. The new application server will issue the same queries as the other application servers, but its IP address will not be recognized by the DIDS 120. In still another example, the recognized query might use a wildcard character within one of its fields. However, during the training period, the use of wildcard parameters for the specific field may have never been observed by the DIDS 120. This example is most likely an attack scenario, or a mis-training of the DIDS 120 system.

The conversion module 306 can manage the known query text, anomalous parameters situation by converting the anomalous query into a characteristic representation, as described above. Specifically, the conversion module 306 can create a tuple for the anomalous query describing anomaly parameters for each case. The set of violations and specific parameters for each violation are used to create the tuple. Examples of such tuples can include the following: {different_user_violation: jim, different_ip_violation: 1.2.5.7}, {different_ip_violation: 1.8.9.11}, {wildcard_usage_violation: 7} (this indicates that the 7$^{th}$ token of the query had an anomalous wildcarded token, for example), etc.

The conversion module 306 can manage the SQL injection anomalous query by converting the anomalous query into a characteristic representation, and specifically a characteristic representation that distinguishes between the injected and non-injected portions of the query. In this scenario, the text of the anomalous query includes known query text that has been previously observed by the DIDS 120, plus the query has additional tokens that represent the injected query logic that probably is not known to the DIDS 120. In some embodiments, the query with injected code is canonicalized as described above, by replacing literal field values in the query with placeholders. Both the injected and non-injected portions of the query can be canonicalized, or the canonicalization can be limited to just one or the other. In some embodiments, the conversion module 306 replaces the injected code with a representative value or otherwise flags the query as one that contains injected code.

The aggregation module 308 aggregates into a group the anomalous queries with substantially similar characteristic representations according to anomaly type. In some embodiments, the aggregation module 308 can generate a hash of the characteristic representation for the anomalous query and can use the hash as an index to identify substantially similar anomalous queries. Other techniques for identifying the similar anomalous queries for aggregation can also be used.

In the case of an anomalous query with anomalous query text, the aggregation module 308 can determine whether two queries belong to the same canonicalized group by taking a hash (e.g., CRC or MD5 checksum) of each event's canonicalized SQL text. This hash can be used as an index to identify all equivalent SQL query events. In the case of an anomalous query with known query text but anomalous parameters, the determination module can determine if two queries belong to the same tuple class by taking a hash (e.g. CRC or MD5) of each event's tuple. This hash can be used as an index to identify all related events.

The aggregation module 308 aggregates the anomalous queries into groups, according to anomaly type, in some embodiments. For example, for anomalous queries including anomalous query text, the aggregation module 308 can aggregate all anomalous query text events with substantially similar or the same canonicalized SQL text together into a single incident. As another example, all anomalous queries with known query text and anomalous parameters that have the substantially similar or the same exact tuple can be classified together into a single incident. This approach therefore groups together a number of recognized queries that were issued by an unrecognized user.

In the case of SQL injection, the aggregation module 308 can aggregate based not on the malicious query or the injected query logic, but on the text of the known portion of the query. The anomalous query with injected text will closely match with a query that the DIDS 120 has seen in the past because the anomalous query has every key word that the previously observed query had in the same order. However, the anomalous query has additional tokens. Thus, if there are multiple injection attacks that all happen to be compromising a particular known query, then rather than aggregating each of those attacks based on their own query text (including the injected code), the module 308 will aggregate around the text of the known query (not including the injected code). As described above, in some embodiments, the literal field values of the known query text can be replaced by placeholders, and the query can thus be canonicalized to allow aggregation based on the known query text. In some embodiments, the module 308 will flag the query with injected code in some manner (i.e., as described below by replacing injected code with a representative value) so that it is not aggregated with other canonicalized anomalous queries that have the same known query text.

In some embodiments, the aggregation module 308 will replace the injected code with a representative value, and each query with the same known query text (but including potentially different types of injected code) will have the same representative value used to replace the injected code. For example, in the query:

select * from book_table where title='sometitle'; delete from books where title='*' the injected text "delete from books where title='*'" (or whatever other text is injected) will be replaced by a representative value, such as "<INJECTED_QUERY>" or "<INJECTED_QUERY:DELETE ON BOOKS>." Any injected code added after the known query will be replaced with the representative value. Thus, even queries with different code injected into them will still have that code replaced by the same representative value. The query can be further canonicalized as described previously, thereby replacing 'sometitle' with a generic term like "<string>." Therefore, all of the queries will appear to be the same (i.e., same known query text that is canonicalized plus same representative value that replaced the injected code).

It is also possible to aggregate database intrusion events according to various parameters associated with a query. For example, aggregation can be done by the user name, by source IP address, by the names of the specific parameters that were found to be anomalous, and many other different ways. Aggregation can also be done based on multiple aggregation constraints at a time. As an example, the events can be aggregated by both the query text as well as by the user name, or by both source IP address and query text. Thus, aggregation methods are not limited to aggregation by query text alone, but instead aggregation can be based on many different types of parameters associated with queries. In addition, one query can contribute to more than one aggregate in some embodiments.

In some embodiments, an optional counter variable 310 is included in the incident managing module 140. The counter variable 310 can be stored within the detection incident record for a query, and can be used to determine how many instances of this query were observed. A counter variable can also be used to determine how many instances of a particular type of violation matching a given tuple were observed. Thus, the counter variable 310 keeps track of the number of anomalous queries observed by the DIDS 120.

The generation module 312 generates a database intrusion incident report for the group of anomalous queries that were created by the aggregation module 308 to reduce or minimize the number of intrusion incidents presented. Thus, rather than generating a separate event for each anomalous query that has been observed, the generation module 312 can generate a single incident report for each anomalous query observed. For example, the generation module 312 can generate an incident report for each distinct canonicalized SQL query observed, aggregating queries with the same SQL structure together. The generation module 312 can also generate a single incident report for each anomalous query with the same exact tuple. Furthermore, the generation module can generate an incident report for each anomalous query with the same known or non-injected anomalous query text in a code injection attack. This can reduce the number of detection events from potentially millions to a manageable number by categorizing the false positive or malicious events. The security administrator can quickly exclude potentially thousands of related events with a single click of a mouse. False positives can easily be eliminated, even if the false positives are numerous, because they are simply added to an easily identified group. Similarly, malicious events can easily be reviewed because they are also added to an easily identified group.

There are also other types of detections/incidents that a DIDS 120 system will produce, and there are effective ways to organize/aggregate incidents for these other types of events. For example, the DIDS 120 can detect failed logins to the database. The aggregation module 308 can aggregate failed logins by the user for whom the login failed. As another example, the DIDS 120 can detect queries to high-valued fields/tables. The module 308 can aggregate these according to the user issuing the request to the high-valued field or by the field being accessed. As yet another example, the DIDS 120 can be involved in detection of high-valued data (e.g. credit card numbers) in downstream responses to an anomalous query. Aggregation by the module 308 in this case can be by the user issuing the access or the type of data being accessed.

The generation module 312 can generate a single incident report for the aggregates created in each of these examples. These are but a few of the many situations in which aggregation of detection incidents can be applied to group detection events to a manageable number.

Figure 4:
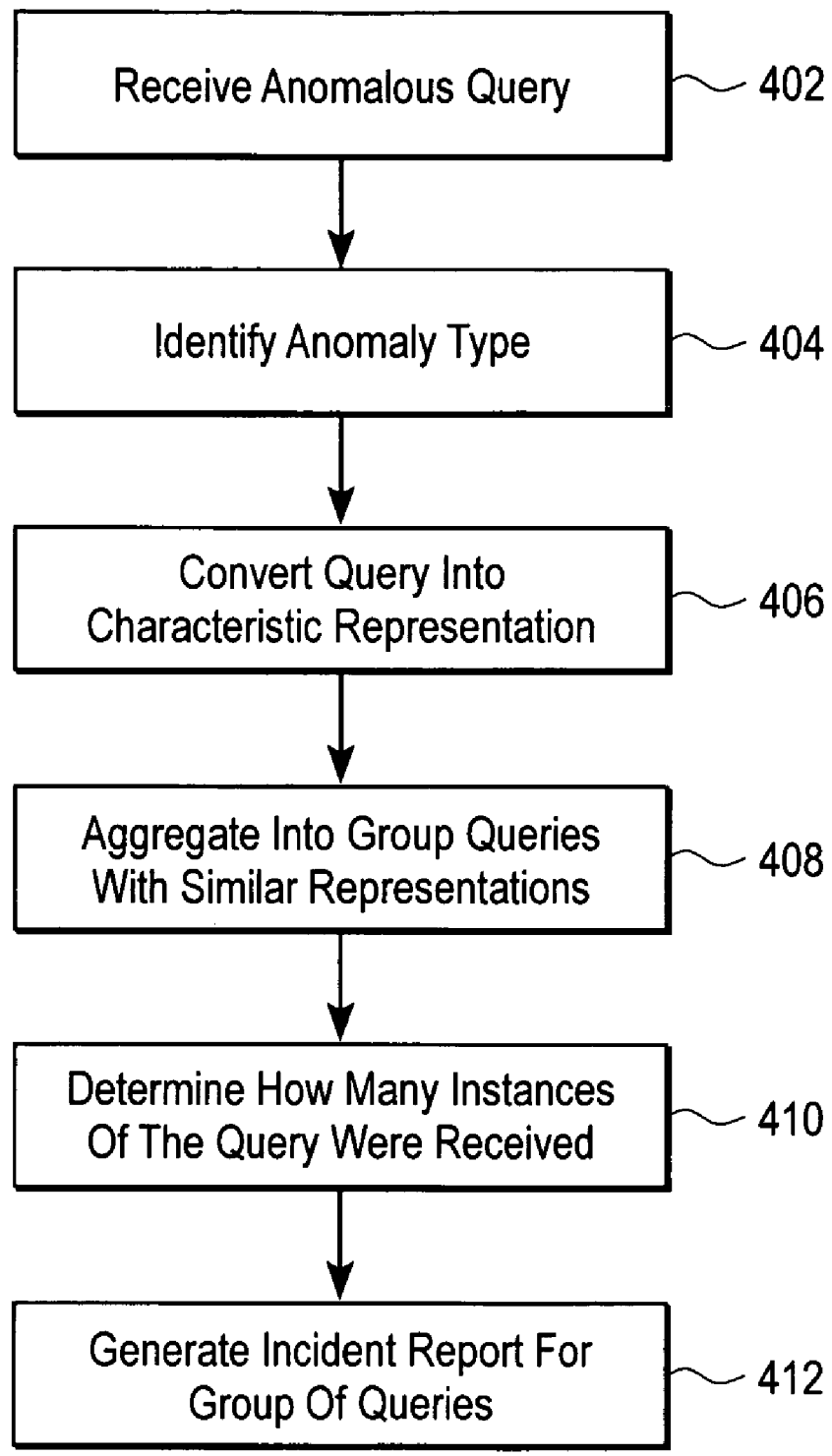
FIG. 4 is a flow chart illustrating steps performed by one embodiment of the incident managing module to aggregate related database intrusion incidents and present these incidents in a manageable manner.

Referring now to FIG. 4, there is shown a flowchart illustrating the operation of the incident managing module 140, according to some embodiments of the present invention. It should be understood that these steps are illustrative only. Different embodiments of the incident managing module 140 may perform the illustrated steps in different orders, omit certain steps, and/or perform additional steps not shown in FIG. 4.

As shown in FIG. 4, the incident managing module 140 receives 402 an anomalous database query requesting data from a database 118. For example, a user might insert a search term into a "search field" in a web form, and thus the user causes a query to be sent to the database 118 requesting the information regarding the search term. The web browser sends the entered values to the server, and the server translates this information into one or more queries that issue to the database using the user-supplied values.

The incident managing module 140 identifies 404 the anomaly type for the query received. As described above, query events can be separated into different categories of anomalous queries. As one example, the query received can have anomalous query text that has generally never seen before by the DIDS 120 and does not match any queries observed during the training session for the DIDS 120.

Another type of anomaly that can be identified 404 is a query with anomalous parameters (e.g., issued by an anomalous user, from an anomalous IP, from an anomalous source machine, having an anomalous field value, etc.), but known query text that has been previously observed during training of the DIDS 120. Thus, the DIDS 120 expects the query that is being issued, but has never observed it being issued from the particular source IP address, so it is identified to be anomalous.

The incident managing module 140 can also identify 404 an anomaly type where anomalous code has been injected into known query text that has been previously observed by the DIDS 120. The DIDS 120 has seen a portion of the text before (i.e., during training), but there is a portion added to or injected into the known query that the DIDS 120 has not generally seen before. In this example, a SQL injection attack may have occurred in which the attacker is injecting code to obtain access to some type of confidential information on the database 118, to modify or delete information on the database 118, or perform other malicious actions or otherwise damage the database 118.

The incident managing module 140 then converts 406 the anomalous query received into a characteristic representation according to anomaly type. There are numerous different ways this conversion can occur and different types of characteristic representations into which the query can be converted. The characteristic representation can vary depending upon the type of anomalous query. In one example, the anomalous query is converted into a characteristic representation by replacing literal field values in the query with representative values in a canonical form. This might be used when an anomalous query with anomalous query text (i.e., the actual text of the query does not match queries observed during training) is received. Thus, the incident managing module 140 canonicalizes the query text of the anomalous query by replacing some or all of the literal field values in the query with placeholders, removing extra whitespaces, etc. In addition, each anomaly detection event may have a slightly different set of parameters (i.e., which user issued the anomalous query, etc.), the module 140 can create a tuple describing anomaly parameters for the anomalous query (e.g., {user, sourceIP,targetdatabase}), and the tuple can be added as an attribute to the incident generated.

Similarly, where a query is received with known query text, but anomalous parameters, the incident managing module 140 converts 406 this into a characteristic representation by creating a tuple that describes anomaly parameters for the anomalous query. The module 140 can identify the violations for the known query. For example, a different user than expected may have issued a query or the query issued from the different IP address than the query is usually issued from, but the query text itself is recognized in both cases. Alternatively, the recognized query might use a wildcard character within one of its fields where the use of wildcard parameters for the specific field may have never been observed by the DIDS 120 before. The set of violations and specific parameters for each violation are used to create the tuple (e.g., {different_user_violation: jim, different_ip_violation: 1.2.5.7}, {different_ip_violation: 1.8.9.11}, {wildcard_usage_violation: 7}, etc.).

Where a query has been received that has known query text with injected code (i.e., the query includes both injected code and non-injected code), the incident managing module 140 can convert 406 the anomalous query into a characteristic representation that distinguishes between injected and non-injected portions of the query. In some embodiments, the module 140 canonicalizes the query, and thus replaces literal field values in the query with representative values. The canonicalized query with injected and non-injected code can then be flagged in some manner to indicate that it includes injected code.

Once the anomalous query has been converted 406 into a characteristic representation, the incident managing module 140 aggregates 408 into a group the anomalous queries with substantially similar characteristic representations. In some embodiments, the module 140 aggregates 408 by generating a hash of the characteristic representation for the anomalous query (or using some other similar technique) and using the hash as an index to identify substantially similar anomalous queries.

The incident managing module 140 aggregates 408 the anomalous queries into groups. For example, anomalous queries including anomalous query text the module 140 can aggregate 408 the anomalous query with other anomalous queries that have substantially similar canonicalized text together into a group to represent a single intrusion incident. For anomalous queries with known query text and anomalous parameters, the module 140 can aggregate the anomalous query with other anomalous queries that have substantially similar tuple field values in same tuple field together into a group to represent a single intrusion incident.

In the case of SQL injection, the module 140 can aggregate 408 based not on the injected query logic or additional tokens, but principally on the text of the non-injected or known portion of the query. Thus, rather than aggregating 408 based on the injected query text, the module 140 will aggregate 408 around the text of the known or non-injected portion of the query.

In some embodiments, the incident managing module 140 optionally determines 410 how many instances of the query were received. The module 140 can also be used to determine 410 how many instances of a particular type of violation matching a given tuple were observed The incident managing module 140 then generates 412 a database intrusion incident report for the group of anomalous queries to reduce the number of intrusion incidents presented. Thus, rather than generating a separate event for each anomalous query that has been observed, the module 140 can generate 412 a single incident for each anomalous query. For example, the module 140 can generate 412 an incident for each distinct canonicalized SQL query observed or can also generate a single incident for each anomalous query with the same tuple. Furthermore, the generation module can generate an incident for a group of queries with injected code that were aggregated into the group based on the non-injected code present in the queries.

Therefore, rather than generating an incident report for each anomalous query detected, the incident managing module 140 aggregates 408 the anomalous queries into a group and an incident report is generated 412 for the group. This incident managing module 140 can thus reduce the number of detection events by a DIDS 120 from potentially millions to a manageable number by categorizing the detection events. False positives can easily be eliminated, even if the false positives are numerous, because they are simply added to an easily identified group.

As will be understood by those familiar with the art, the invention may be embodied in other specific forms without departing from the spirit or essential characteristics thereof. Likewise, the particular naming and division of the modules; managers, features, attributes, methodologies and other aspects are not mandatory or significant, and the mechanisms that implement the invention or its features may have different names, divisions and/or formats. Furthermore; as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer program product for aggregating and presenting a database intrusion incident, the computer program product comprising a computer-readable storage medium containing executable computer program code for:

receiving, from a database intrusion detection system, an anomalous database query requesting data from a database, the database intrusion detection system configured to separate acceptable database queries from anomalous database queries that are expected to have undesired effects on the database, wherein database queries are determined to be anomalous when the database queries differ from the acceptable database queries observed by the database intrusion detection system, the anomalous database query having at least one anomalous attribute;

identifying an anomaly type for the anomalous database query received, the anomaly type defining a category of anomalous database queries having similar anomalous attributes;

converting the anomalous database query into a characteristic representation, the characteristic representation describing the anomalous attribute of the anomalous database query in a generic form for grouping according to the anomaly type;

aggregating the anomalous database query and other anomalous database queries with substantially similar characteristic representations into a group of anomalous database queries to represent a single intrusion incident, wherein the other anomalous database queries are identified for aggregation into the group using an index generated based on the characteristic representation of the anomalous database query; and generating a database intrusion incident report describing the group of anomalous database queries.

2. The computer program product of claim 1, wherein aggregating further comprises aggregating based on one or more aggregation constraints selected from a group consisting of: query text, user name, query source IP address, or names of the specific parameters that were found to be anomalous.

3. The computer program product of claim 1, wherein the anomaly type for the query received is selected from a group consisting of: anomalous query text that has not been previously received, anomalous parameters but known query text that has been previously received, and anomalous code injected into known query text that has been previously received.

4. The computer program product of claim 1, wherein converting further comprises converting the anomalous database query into the characteristic representation by replacing literal field values in the query with representative values in a canonical form.

5. The computer program product of claim 1, wherein converting further comprises converting the anomalous database query into the characteristic representation by creating a tuple that describes anomaly parameters for the anomalous database query.

6. The computer program product of claim 1, wherein the anomalous database query comprises injected code and non-injected code, and wherein converting further comprises converting the anomalous database query into a characteristic representation that distinguishes between injected and non-injected portions of the query.

7. The computer program product of claim 1, wherein aggregating further comprises generating a hash of the characteristic representation for the anomalous database query and using the hash as the index to identify substantially similar anomalous database queries.

8. The computer program product of claim 4, wherein aggregating further comprises aggregating the anomalous database query with the other anomalous database queries that have substantially similar canonicalized forms together into a group to represent a single intrusion incident.

9. The computer program product of claim 5, wherein aggregating further comprises aggregating the anomalous database query with the other anomalous database queries that have substantially similar tuple field values in a same tuple field together into a group to represent a single intrusion incident.

10. The computer program product of claim 6, wherein aggregating further comprises aggregating the anomalous database query with the other anomalous database queries by aggregating principally on the non-injected portion of the query.

11. The computer program product of claim 1, further comprising a counter variable configured to determine how many instances of the anomalous database query were received.

12. A computer-implemented method for aggregating and presenting a database intrusion incident, the method comprising:
using a computer processor configured to execute method steps, the steps comprising:
receiving, from a database intrusion detection system, an anomalous database query requesting data from a database, the database intrusion detection system configured to separate acceptable database queries from anomalous database queries that are expected to have undesired effects on the database, wherein database queries are determined to be anomalous when the database queries differ from the acceptable database queries observed by the database intrusion detection system, the anomalous database query having at least one anomalous attribute;
identifying an anomaly type for the query received, the anomaly type defining a category of anomalous database queries having similar anomalous attributes;
converting the anomalous database query into a characteristic representation, the characteristic representation describing the anomalous attribute of the anomalous database query in a generic form for grouping according to the anomaly type;
aggregating the anomalous database query and other anomalous database queries with substantially similar characteristic representations into a group of anomalous database queries to represent a single intrusion incident, wherein the other anomalous database queries are identified for aggregation into the group using an index generated based on the characteristic representation of the anomalous database query; and
generating a database intrusion incident report describing the group of anomalous database queries.

13. The method of claim 12, wherein converting the anomalous database query into the characteristic representation further comprises replacing literal field values in the query with representative values in a canonical form.

14. The method of claim 12, wherein converting the anomalous database query into the characteristic representation further comprises creating a tuple that describes anomaly parameters for the anomalous database query.

15. The method of claim 12, wherein the anomalous query comprises injected code and non-injected code, and wherein converting the anomalous database query into the characteristic representation further comprises converting the anomalous database query into a characteristic representation that distinguishes between injected and non-injected portions of the query.

16. The method of claim 12, further comprising:
generating a hash of the characteristic representation for the anomalous database query; and
using the hash as the index to identify substantially similar anomalous database queries.

17. The method of claim 12, wherein the anomaly type comprises anomalous query text.

18. The method of claim 12, wherein the anomaly type comprises known query text with anomalous parameters.

19. The method of claim 12, wherein the anomaly type comprises injected anomalous code.

20. The method of claim 13, wherein aggregating further comprises aggregating the anomalous database query with the other anomalous database queries that have substantially similar canonicalized text.

21. The method of claim 14, wherein aggregating further comprises aggregating the anomalous database query with the other anomalous database queries that have substantially similar tuple field values in the same tuple field.

22. The method of claim 15, wherein aggregating further comprises aggregating the anomalous database query with the other anomalous database queries by aggregating principally on the non-injected portion of the query.

23. A computer system for a database intrusion system for aggregating and presenting a database intrusion incident, the computer system comprising:
a computer-readable storage medium configured to store software modules comprising:
a receiving module configured to receive, from a database intrusion detection system, an anomalous database query requesting data from a database, the database intrusion detection system configured to separate acceptable database queries from anomalous database queries that are expected to have undesired effects on the database, wherein database queries are determined to be anomalous when the database queries differ from the acceptable database queries observed by the database intrusion detection system, the anomalous database query having at least one anomalous attribute;
a type-identification module configured to identify an anomaly type for the query received, the anomaly type defining a category of anomalous database queries having similar anomalous attributes;
a conversion module configured to convert the anomalous database query into a characteristic representation, the characteristic representation describing the anomalous attribute of the anomalous database query in a generic form for grouping according to the anomaly type;
an aggregation module configured to aggregate anomalous database queries the anomalous database query and other with substantially similar characteristic representations into a group of anomalous database queries to represent a single intrusion incident, wherein the other anomalous database queries are identified for aggregation into the group using an index generated based on the characteristic representation of the anomalous database query;
a generation module configured to generate a database intrusion incident report describing the group of anomalous database queries; and
a processor configured to execute the software modules stored by the computer-readable storage medium.

24. The system of claim 23, wherein the conversion module is further configured to convert the anomalous database query into the characteristic representation by replacing literal field values in the query with representative values in a canonical form.

25. The system of claim 23, wherein the conversion module is further configured to convert the anomalous database query into the characteristic representation by creating a tuple that describes anomaly parameters for the anomalous database query.

26. The system of claim 23, wherein the anomalous database query comprises injected code and non-injected code, and wherein the conversion module is further configured to convert the anomalous database query into a characteristic representation that distinguishes between injected and non-injected portions of the query.

27. The system of claim 25, wherein the tuple is added as an attribute to the incident generated, the tuple including a count to indicate how many times the tuple of parameters was seen.

28. The system of claim 27, wherein a maximum threshold number of tuples is stored with the incident before subsequent tuples are discarded.

29. The system of claim 23, wherein the aggregation module is further configured aggregate the anomalous database query based on query text and on user name.

* * * * *